US012631504B2

(12) United States Patent
Kobayashi et al.

(10) Patent No.: US 12,631,504 B2
(45) Date of Patent: May 19, 2026

(54) SENSOR MEMBER FOR PHYSICAL QUANTITY DETECTION

(71) Applicant: TDK CORPORATION, Tokyo (JP)

(72) Inventors: Masanori Kobayashi, Tokyo (JP); Ken Unno, Tokyo (JP); Tetsuya Sasahara, Tokyo (JP); Tetsuo Hata, Tokyo (JP); Lucie Ouedraogo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 223 days.

(21) Appl. No.: 18/454,194

(22) Filed: Aug. 23, 2023

(65) Prior Publication Data

US 2024/0068891 A1    Feb. 29, 2024

(30) Foreign Application Priority Data

Aug. 31, 2022    (JP) ................................. 2022-138403
Feb. 22, 2023    (JP) ................................. 2023-026424

(51) Int. Cl.
*G01L 1/22* (2006.01)

(52) U.S. Cl.
CPC .................................. *G01L 1/2287* (2013.01)

(58) Field of Classification Search
None
See application file for complete search history.

(56) References Cited

U.S. PATENT DOCUMENTS

| | | | |
|---|---|---|---|
| 10,921,205 B2 | 2/2021 | Kanazawa et al. | |
| 2005/0193836 A1* | 9/2005 | Yoshida ................ | G01L 9/0051 |
| | | | 73/862.628 |

| | | | |
|---|---|---|---|
| 2011/0226069 A1 | 9/2011 | Kim et al. | |
| 2015/0001650 A1* | 1/2015 | Matsunami .......... | G01L 9/0055 |
| | | | 438/51 |
| 2017/0082512 A1 | 3/2017 | Saitoh et al. | |
| 2020/0386641 A1 | 12/2020 | Pfeiffer et al. | |
| 2023/0273083 A1 | 8/2023 | Kobayashi et al. | |
| 2024/0170189 A1 | 5/2024 | Nawaoka et al. | |

FOREIGN PATENT DOCUMENTS

| | | |
|---|---|---|
| JP | 2005-249520 A | 9/2005 |
| JP | 2022-014344 A | 1/2022 |
| WO | 2018131170 A1 | 7/2018 |
| WO | 2022209963 A1 | 10/2022 |
| WO | 2023276884 A1 | 1/2023 |

OTHER PUBLICATIONS

Jan. 4, 2024 Extended Search Report issued in European Patent Application No. 23193235.1.
Dec. 21, 2023 Extended Search Report issued in European Patent Application No. 23193398.7.
U.S. Appl. No. 18/454,170, filed on Aug. 23, 2023 in the name of Masanori Kobayashi.
Aug. 18, 2025 Office Action issued in U.S. Appl. No. 18/454,170.

* cited by examiner

*Primary Examiner* — Eric S. McCall
*Assistant Examiner* — Nigel H Plumb
(74) *Attorney, Agent, or Firm* — OLIFF PLC

(57) ABSTRACT

A sensor member including a membrane; a protective film covering a part of the membrane; and an electrode portion connected to the membrane, wherein the electrode portion covers at least a part of the protective film, whereby a peeling defect such as peeling off from an end of the protective film or damage due to impact can be prevented.

11 Claims, 7 Drawing Sheets

5

55

54

55

54

54

55

54

55

SENSOR MEMBER FOR PHYSICAL QUANTITY DETECTION

BACKGROUND OF THE INVENTION

Field of the Invention

The present invention relates to a sensor member used for, for example, a pressure sensor or the like.

Description of the Related Art

As disclosed in JP 2005-249520 A, a film-shaped sensor including a strain-resistance film is known. In such a sensor, in order to protect the strain-resistance film, a protective film is formed to cover the strain-resistance film.

However, the protective film has a portion with poor adhesiveness, and there is a risk of occurrence of a peeling defect.

CITATION LIST

Patent Document 1: JP 2005-249520 A

BRIEF SUMMARY OF THE INVENTION

The present invention has been conceived in view of the foregoing circumstances, and an object of the present invention is to provide a sensor member with a small risk of damage.

In order to achieve the foregoing object, according to the present invention, there is provided a sensor member including: a membrane; a protective film covering a part of the membrane; and an electrode portion connected to the membrane. The electrode portion covers at least a part of the protective film.

Since an electrode is formed on the protective film by implementing such a configuration, a peeling defect such as peeling off from an end of the protective film or damage due to impact can be prevented.

Preferably, the electrode portion includes a mounting layer containing gold.

Since the mounting layer contains gold, the adhesiveness of the mounting layer to an Au wiring with good heat resistance is particularly good. Therefore, the electrode portion including such a mounting layer is improved in high-temperature resistance, and exhibits good adhesion to the wiring.

Preferably, the electrode portion includes a diffusion prevention layer consisting of a platinum group element.

Since the diffusion prevention layer contains a platinum group element that is chemically stable, interdiffusion between the membrane and the electrode portion can be effectively prevented.

Preferably, the electrode portion includes a contact layer contacting with the membrane.

The electrode portion including such a contact layer can effectively prevent interdiffusion between the membrane and the electrode portion. In addition, the electrode portion including the contact layer prevents a change in the property of the membrane under a high temperature environment, is improved in high-temperature resistance, and exhibits very good adhesion to the wiring even after being exposed to the high temperature environment.

Examples of an element contained in such a contact layer are Cr, Ti, Ni, Mo, and the like. Since such elements easily form alloys with other metal elements, such elements are effective in preventing a peeling defect of the films by ensuring adhesion strength between the films and between the layers.

Preferably, the protective film consists of an oxynitride.

Since such a protective film has high strength, the structural strength particularly at an end portion can be improved, and the reliability of the sensor member can be improved.

Preferably, the membrane includes a metal base member, an insulating film placed on the metal base member, and a strain-resistance film placed on the insulating film.

Such a membrane is suitable for use in a pressure sensor in a high temperature environment. In addition, since metal is used as a base material, the pressure sensor with high mechanical strength and high reliability can be realized. Incidentally, the sensor member may be used for physical quantity sensors other than the pressure sensor, such as an acceleration sensor, a torque sensor, and an inclination sensor.

Preferably, the electrode portion is disposed as an upper layer of the strain-resistance film to spread outward from the strain-resistance film.

Since the contacting area between the electrode portion and the protective film is increased, the strain-resistance film can be effectively protected from an external environment.

Preferably, the electrode portion is disposed as an upper layer of the strain-resistance film and inside the strain-resistance film.

Since the electrode portion is disposed in such a manner, a reduction in the size of the sensor member can be realized.

Preferably, the strain-resistance film includes a resistance portion that detects a pressure.

Such a sensor member is suitably used for the pressure sensor.

DETAILED DESCRIPTION OF THE INVENTIONS

Figure 1:
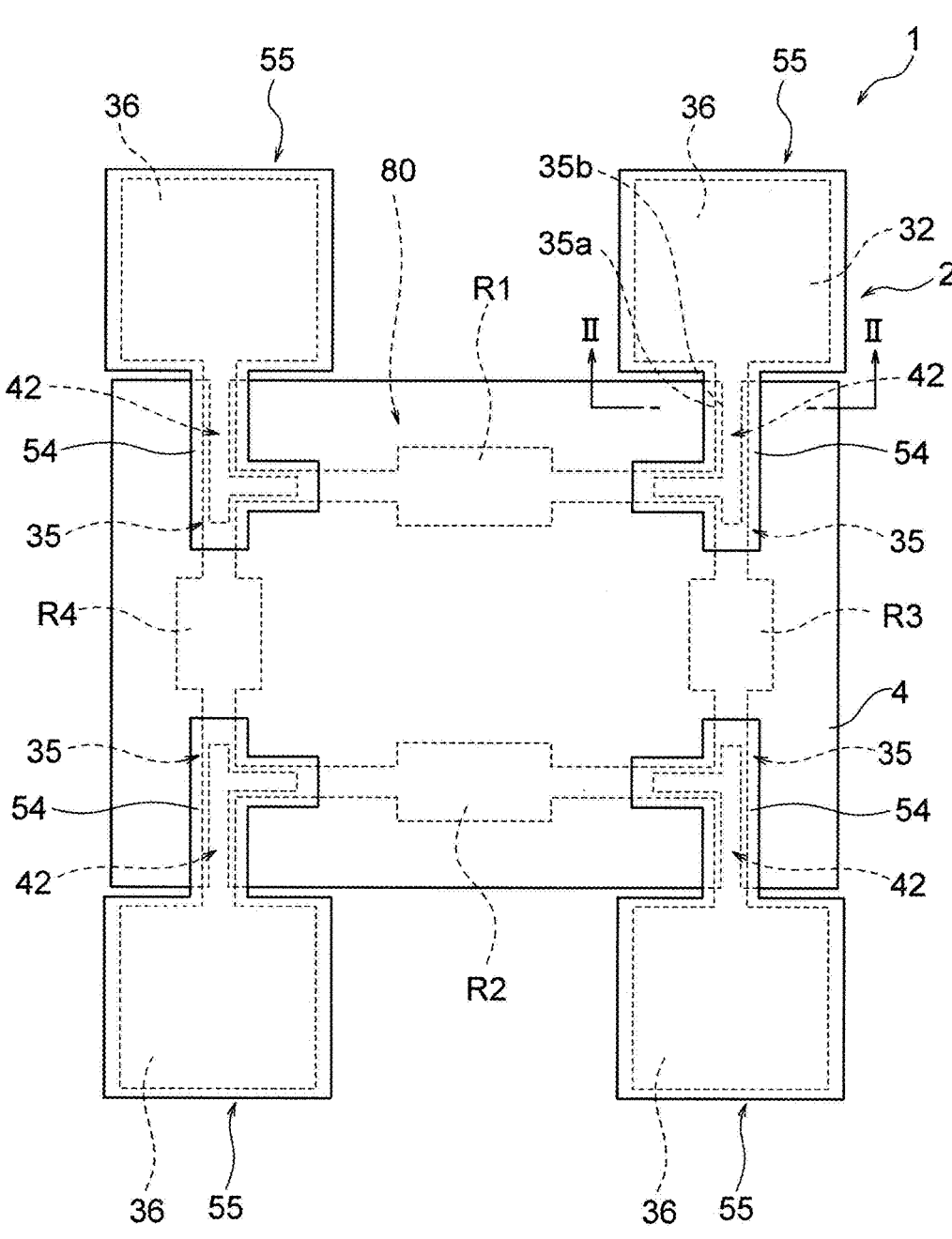
FIG. 1 is a plan view of a pressure sensor including a sensor member according to one embodiment when viewed from above.

Embodiments of the present invention will be described with reference to the drawings. The description will be made with reference to the drawings as necessary; however, the illustrated contents are merely schematic and exemplary for the understanding of the present invention, and the appearance, dimensional ratios, and the like may differ from the actual ones. In addition, hereinafter, the present invention will be specifically described based on the embodiments, but is not limited to these embodiments.

First Embodiment

An overall configuration of a sensor member 2 according to the present embodiment will be described. The sensor member 2 can be suitably used for, for example, a pressure sensor 1 illustrated in FIG. 1. FIG. 2 is a cross-sectional view of the sensor member 2 illustrated in FIG. 1, taken along line II-II. As illustrated in FIG. 2, the sensor member 2 includes a membrane 3, a protective film 4, and an electrode portion 5.

The membrane 3 includes a metal base member 30; an insulating film 31 placed on the metal base member 30; and a strain-resistance film 32 placed on the insulating film 31. The metal base member 30 only needs to be able to hold the insulating film 31 and the strain-resistance film 32, and is made of metal such as steel, aluminum alloy, stainless steel, or nickel alloy. The metal base member 30 may be configured to undergo deformation corresponding to pressure. As the metal base member 30, the above-described metals can be used, and particularly, austenitic stainless steels such as SUS304 and SUS316, precipitation hardening stainless steels such as SUS630 and SUS631, and the like are preferably used from the viewpoint of durability at high temperatures or the like.

The shape of the metal base member 30 is not particularly limited. For example, the metal base member 30 may be formed in a hollow cylindrical shape having a space below. The metal base member 30 may be formed such that the insulating film 31 and the strain-resistance film 32 are formed on an end wall disposed at one end of the hollow cylinder. The sensor member 2 can measure a pressure of a fluid flowing through the hollow space of the metal base member 30.

As illustrated in FIG. 2, the insulating film 31 covers an upper surface of the metal base member 30. In addition, the insulating film 31 is located between the metal base member 30 therebelow and the strain-resistance film 32 thereabove to ensure electrical insulation between the metal base member 30 and the strain-resistance film 32.

Figure 2:
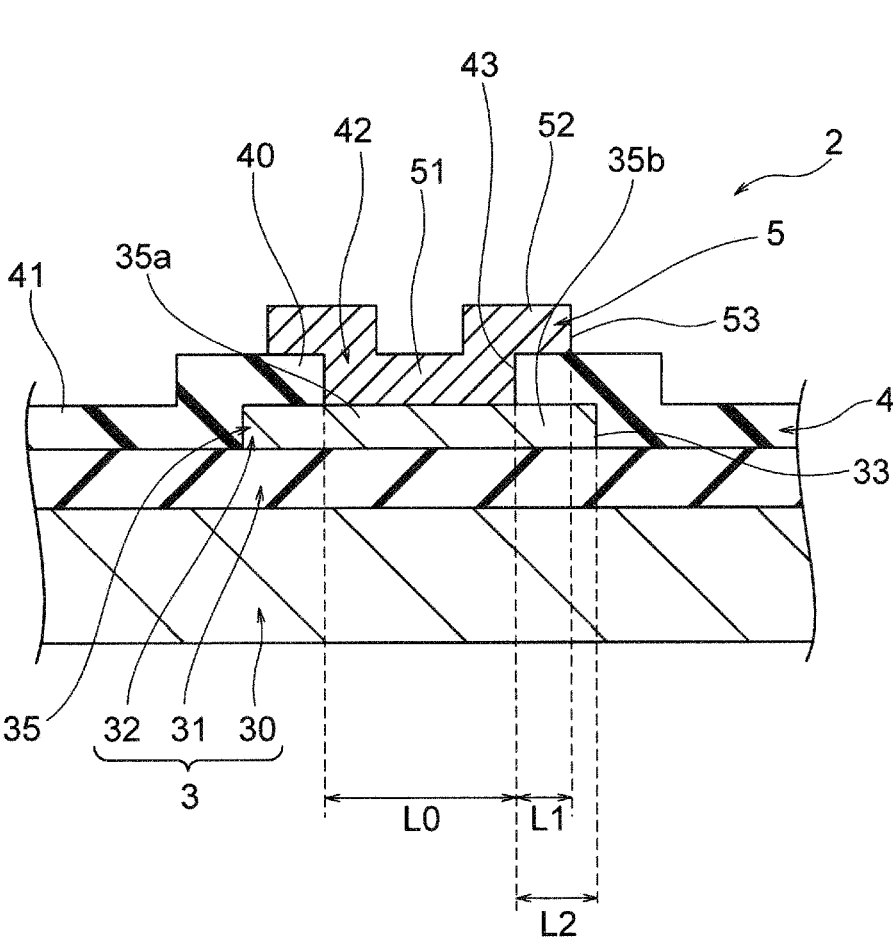
FIG. 2 is a cross-sectional view of the sensor member illustrated in FIG. 1, taken along line II-II.

Although not illustrated in FIG. 1, the insulating film 31 is formed to cover substantially the entirety of the upper surface of the metal base member 30. The insulating film 31 is composed of, for example, an insulating film made of silicon oxide, silicon nitride, silicon oxynitride, or the like. A thickness of the insulating film 31 is preferably 10 μm or less, further preferably 1 to 5 μm. The insulating film 31 can be formed on the upper surface of the metal base member 30, for example, by a vapor deposition method such as CVD.

Figure 4:
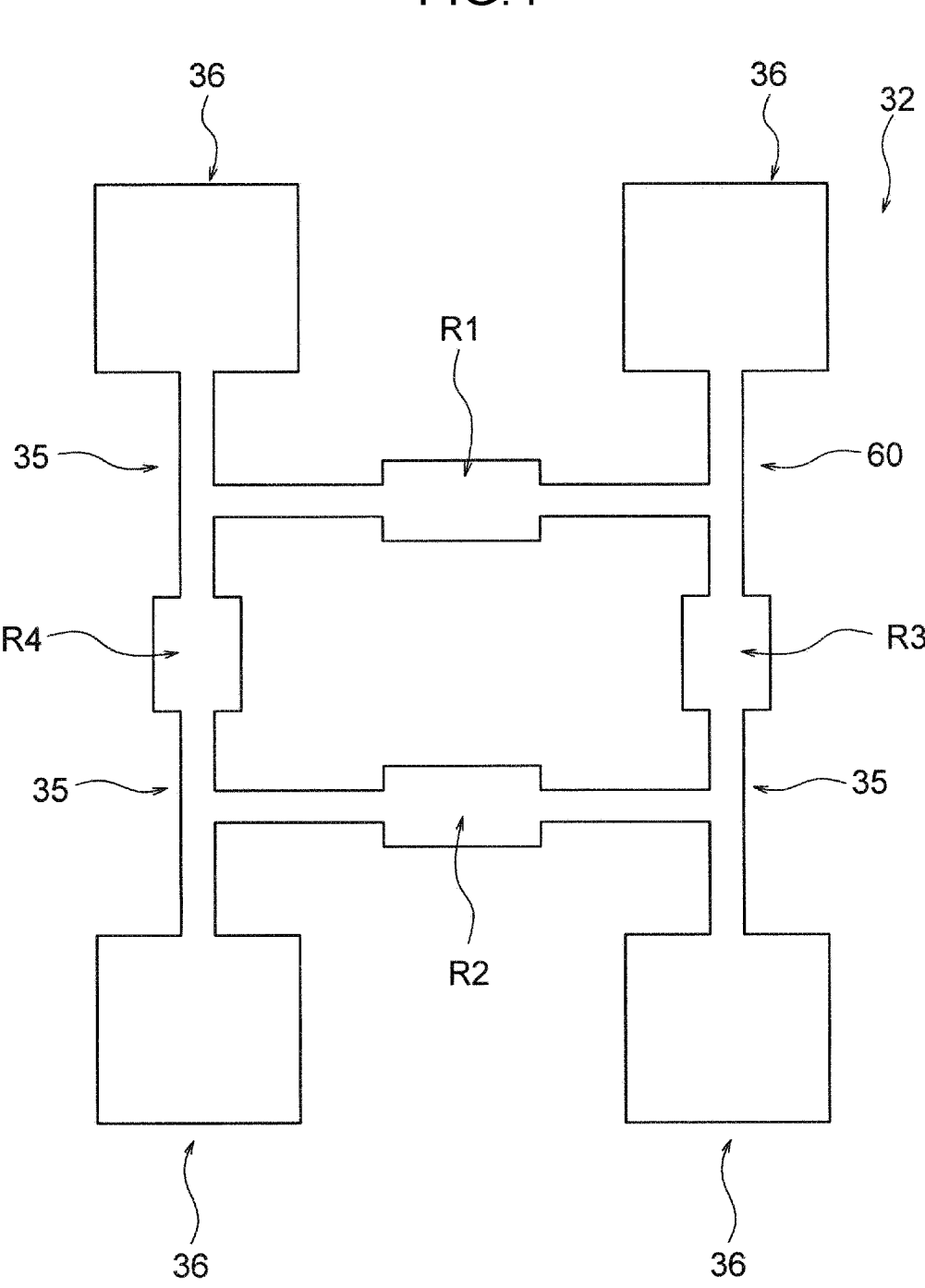
FIG. 4 is a plan view of a strain-resistance film of the pressure sensor illustrated in FIG. 1.

As illustrated in FIG. 2, the strain-resistance film 32 is formed on the insulating film 31, and constitutes a detection portion 34 illustrated in FIG. 1. As illustrated in FIG. 4, in the strain-resistance film 32, pad connection portions 36, a first resistance portion R1, a second resistance portion R2, a third resistance portion R3, and a fourth resistance portion R4 are formed in a predetermined pattern by being connected by resistance wiring portions 35. The first to fourth resistance portions R1, R2, R3, and R4 generate strain corresponding to the deformation of the metal base member 30, and are changed in resistance according to the deformation of the metal base member 30. The first to fourth resistance portions R1 to R4 are connected by the resistance wiring portions 35 formed in the same strain-resistance film 32, so as to constitute a Wheatstone bridge circuit as the detection portion 34.

In addition, since the deformation amount of the metal base member 30 detected by the detection portion 34 changes depending on the pressure of the fluid or the like acting on the metal base member 30, the detection portion 34 can detect the pressure acting on the metal base member 30. Namely, the first to fourth resistance portions R1 to R4 of the sensor member 2 illustrated in FIG. 1 are provided at positions where the metal base member 30 is deformed and strained by pressure, and are configured such that the resistances change according to the strain amounts thereof. Incidentally, the pressure sensor 1 illustrated in FIG. 1 is connected to a circuit substrate (not illustrated) from pad portions 55, and can receive an output of the detection portion 34 of the sensor member 2 or supply electric power from a power supply unit to the sensor member 2.

The strain-resistance film 32 including the first to fourth resistance portions R1 to R4 can be produced, for example, by patterning a conductive thin film made of a predetermined material. The strain-resistance film 32 contains, for example, Cr and Al, preferably contains 50 to 99 at % of Cr and 1 to 50 at % of Al, and further preferably contains 70 to 90 at % of Cr and 5 to 30 at % of Al. Since the strain-resistance film 32 contains Cr and Al, the temperature coefficient of resistance (TCR) or temperature coefficient of sensitivity (TCS) under a high temperature environment is stable and highly accurate pressure detection can be performed. In addition, both a high gauge factor and good temperature stability can be achieved at a higher level by setting the amounts of Cr and Al within predetermined ranges.

The strain-resistance film 32 may contain an element other than Cr and Al, and for example, the strain-resistance film 32 may contain O or N. O or N contained in the strain-resistance film 32, which is not completely removed and remains in a reaction chamber when the strain-resistance film 32 is formed, may be incorporated into the strain-resistance film 32. In addition, O or N contained in the strain-resistance film 32 may be intentionally introduced into the strain-resistance film 32 by being used as an atmospheric gas during film formation or during annealing.

In addition, the strain-resistance film 32 may contain a metal element other than Cr and Al. The strain-resistance film 32 may contain a small amount of a metal or non-metal element other than Cr and Al, and heat treatment such as annealing may be performed, so that the gauge factor or temperature property is improved. Examples of the metal and non-metal elements other than Cr and Al contained in the strain-resistance film 32 include Ti, Nb, Ta, Ni, Zr, Hf, Si, Ge, C, P, Se, Te, Zn, Cu, Bi, Fe, Mo, W, As, Sn, Sb, Pb, B, Ge, In, Tl, Ru, Rh, Re, Os, Ir, Pt, Pd, Ag, Au, Co, Be, Mg, Ca, Sr, Ba, Mn, and rare earth elements.

The strain-resistance film 32 can be formed by a thin film method such as sputtering or vapor deposition. The first to fourth resistance portions R1 to R4 can be formed, for example, by patterning a thin film into a meandering shape. The thickness of the strain-resistance film 32 is not particularly limited, and is preferably 10 μm or less, further preferably 0.1 to 1 μm. Incidentally, as illustrated in FIG. 2, the resistance wiring portions 35 are formed by patterning the strain-resistance film 32.

As illustrated in FIG. 2, the protective film 4 is formed on the membrane 3 (on the insulating film 31 and the strain-resistance film 32). The protective film 4 includes a protective portion 40 covering the strain-resistance film 32 from above, and an outer edge portion 41 covering the insulating film 31 from above. The protective film 4 covers at least a part of the membrane 3 from above.

Figure 5:
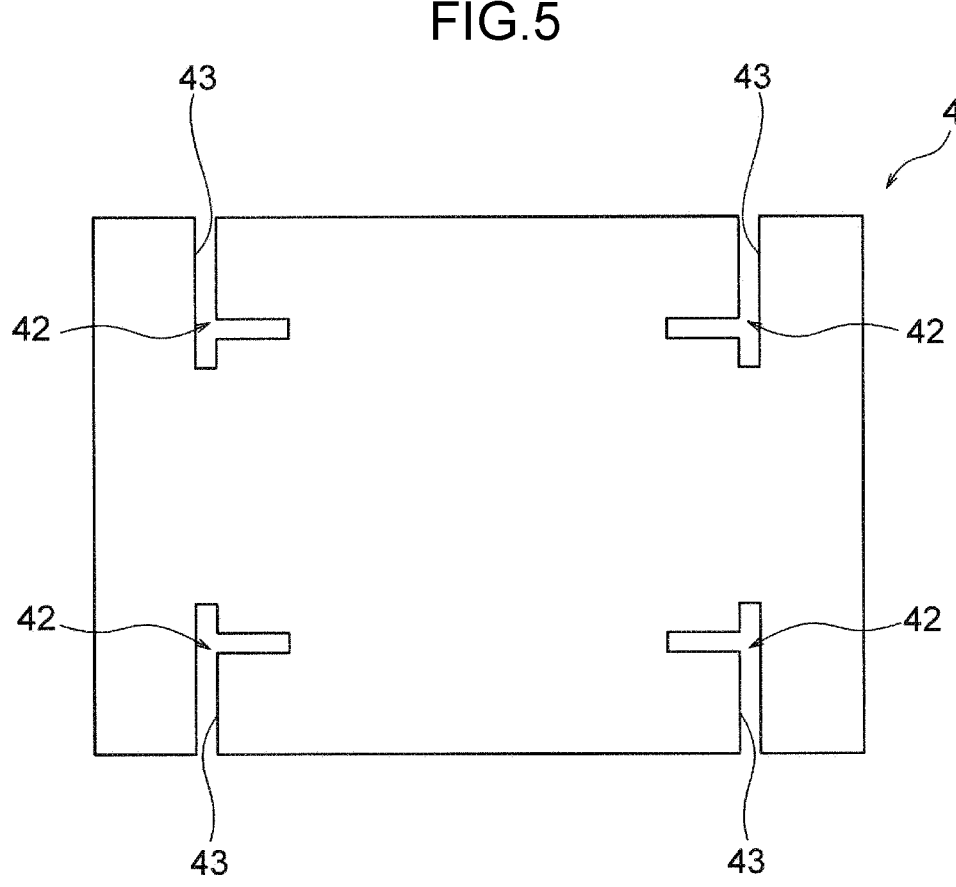
FIG. 5 is a plan view of a protective film of the pressure sensor illustrated in FIG. 1.

In the protective film 4, openings 42 are formed in a predetermined pattern as illustrated in FIG. 5. As illustrated in FIG. 1, the protective film 4 covers the first to fourth resistance portions R1 to R4 and central portions 35_a_ of the resistance wiring portions 35 in the strain-resistance film 32, but does not cover the pad connection portions 36 and side portions 35_b_ of the resistance wiring portions 35. The pattern of the protective film 4 is not limited to this pattern, and may be a pattern in which side portions of the pad connection portions 36 are covered. As illustrated in FIG. 2, the openings 42 are formed inside the protective portion 40 of the protective film 4 so as to be connected to upper surfaces of the central portions 35a of the resistance wiring portions 35 of the strain-resistance film 32.

The protective film 4 is composed of, for example, an insulating film similarly to the insulating film 31. Examples of the insulating film constituting the protective film 4 include films made of an oxide, a nitride, and an oxynitride, and these films are preferably used from the viewpoint of improving the strength of the protective film 4. More specifically, examples of the material constituting the protective film 4 include $SiO_2$, SiON, $Si_3N_4$, $AlO_3$, and $ZrO_2$.

The protective film 4 can be formed on the strain-resistance film 32 and the insulating film 31, for example, by CVD, sputtering, or the like; however, the method for forming the protective film 4 is not particularly limited. The thickness of the protective film 4 is not particularly limited, and is preferably 10 nm to 1000 nm, further preferably 100 nm to 300 nm.

As illustrated in FIGS. 1 and 2, the electrode portion 5 is formed inside the opening 42 of the protective film 4 and on the protective film 4 (on the protective portion 40). The electrode portion 5 includes an energized portion 51 electrically connected to the strain-resistance film 32, and a skirt portion 52 covering the protective film 4 from above. The electrode portion 5 covers at least a part of the protective film 4 from above.

Figure 6:
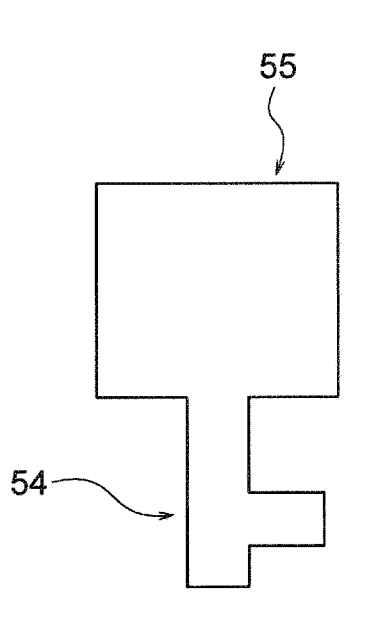
FIG. 6 is a plan view of an electrode portion of the pressure sensor illustrated in FIG. 1.
Figure 6:
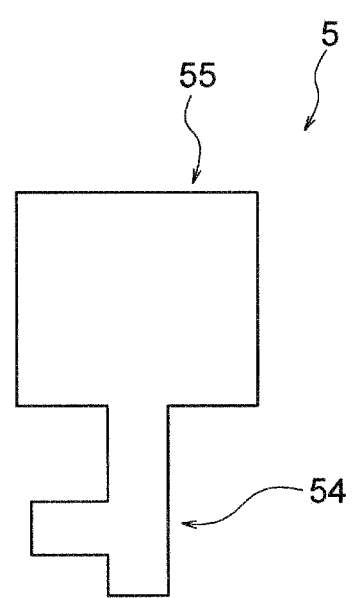
Figure 6:
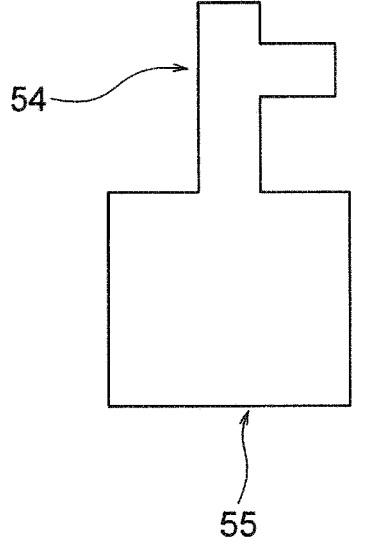
Figure 6:
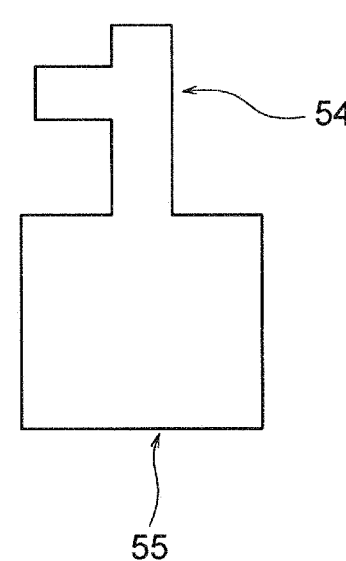

The electrode portion 5 is formed in a predetermined pattern including a wiring portion 54 and the pad portion 55 as illustrated in FIG. 6. As illustrated in FIG. 1, the electrode portions 5 are formed at four locations to correspond to the openings 42 of the protective film 4. However, the number and disposition of the electrode portions 5 included in the sensor member 2 are not limited only to the example illustrated in FIG. 1. In addition, the thickness of the electrode portions 5 is not particularly limited and is, for example, 50 to 500 nm, preferably 100 to 300 nm.

As illustrated in FIG. 2, the energized portion 51 is a portion of the electrode portion 5 which is disposed inside an opening peripheral edge 43 of the protective film 4 when the sensor member 2 is viewed from above. A lower portion of the energized portion 51 is disposed in the inside of the opening 42 which is a region inside the opening peripheral edge 43 and lower than an upper end of the protective portion 40, and a lower end of the energized portion 51 is in contact with the strain-resistance film 32. In addition, an upper portion of the energized portion 51 is disposed in a region higher than the upper end of the protective portion 40, and is connected to the skirt portion 52.

The skirt portion 52 is a portion of the electrode portion 5 which is disposed outside the outer edge of the opening 42 when the sensor member 2 is viewed from above. As illustrated in FIG. 2, the skirt portion 52 is provided on the protective portion 40, and the skirt portion 52 is connected to the energized portion 51 on an inner side, the energized portion 51 being disposed in the opening 42. As illustrated in FIG. 1, the wiring portion 54 of the electrode portion 5 is wider than the opening 42 of the protective film 4.

As illustrated in FIG. 2, an end edge 53 of the skirt portion 52 is disposed above the protective portion 40. In addition, the end edge 53 of the skirt portion 52 is disposed inside an end edge 33 of the strain-resistance film 32.

A length L1 of the skirt portion 52 from an inner side connected to the energized portion 51 to the end edge 53 is not particularly limited, but may be, for example, 0.001 times to 5 times a length L0 at which the energized portion 51 is in contact with the central portion 35a of the resistance wiring portion 35 of the strain-resistance film 32. The length L1 of the skirt portion 52 is shorter than a length L2 of the side portion 35b of the resistance wiring portion 35 of the strain-resistance film 32, which is covered with the protective portion 40.

Figure 3:
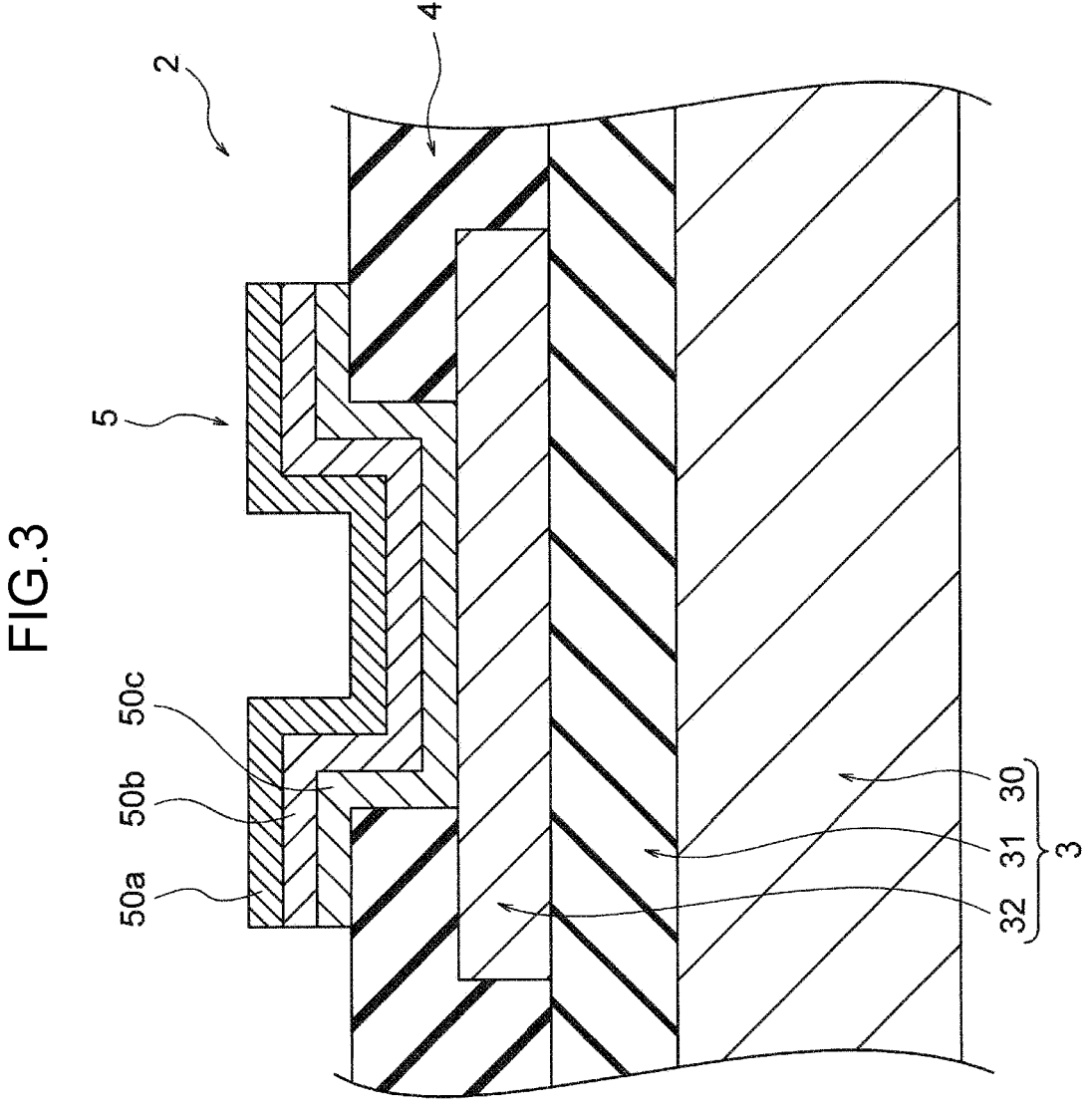
FIG. 3 is an enlarged view of the sensor member illustrated in FIG. 2.

FIG. 3 is an enlarged view of the sensor member 2 illustrated in FIG. 2. As illustrated in FIG. 3, the electrode portion 5 may include a contact layer 50c overlaid on the strain-resistance film 32; a diffusion prevention layer 50b overlaid on the contact layer 50c; and a mounting layer 50a overlaid on the diffusion prevention layer 50b. The electrode portion 5 may have a multilayer film structure of three or more layers made of different materials. However, the electrode portion 5 is not limited only to a three-layered structure as illustrated in FIG. 3, and the electrode portion 5 may have a laminated structure of one, two, or four or more layers.

As illustrated in FIG. 3, the contact layer 50c located at a lowermost layer of the electrode portion 5 is in direct contact with the strain-resistance film 32 and the protective film 4. The contact layer 50c improves the electrical property of the strain-resistance film 32 with an electrode by ensuring ohmic connection with the strain-resistance film 32. In addition, the contact layer 50c prevents a peeling defect of the films and the layers by ensuring adhesion strength between the electrode portion 5 and each of the strain-resistance film 32 and the protective film 4.

The contact layer 50c can be formed by a vapor deposition method, sputtering, or the like. The thickness of the contact layer 50c is not particularly limited and is, for example, 1 to 50 nm, preferably 5 to 20 nm. It is preferable that the contact layer 50c contains at least one of Cr, Ti, Ni, and Mo. Since these elements easily form alloys with other metals, the contact layer 50c containing such elements can prevent a peeling defect between the films and the layers by ensuring adhesion strength between the contact layer 50c and each of the strain-resistance film 32 and the diffusion prevention layer 50b.

In addition, it is particularly preferable that the contact layer 50c contains Ti. Ti has the tendency of being difficult to diffuse into the mounting layer 50a containing Au or the like and being less likely to be deposited on an upper surface of the mounting layer 50a. For this reason, the electrode portion 5 including the contact layer 50c containing Ti exhibits suitable adhesiveness to the strain-resistance film 32 even after the electrode portion 5 is exposed to a high temperature environment.

Further, since it is difficult for Ti to diffuse into Cr, Ti constituting the contact layer 50c has the property of being difficult to diffuse into the strain-resistance film 32 containing Cr and Al even under a high temperature environment. Therefore, even when the strain-resistance film 32 with an electrode including the contact layer 50c containing Ti is used under a high temperature environment, the elements in the electrode portion 5 can be prevented from diffusing into the strain-resistance film 32, and a degradation in the performance of the strain-resistance film 32 due to a change in composition can be prevented.

In addition, it is also preferable that the contact layer 50c contains a plurality of elements selected from Cr, Ti, Ni, and Mo. In addition, it is also preferable that the contact layer 50c consists of at least one of Cr, Ti, Ni, and Mo. Further, it is also particularly preferable that the contact layer 50c consists of Ti. In addition, it is also preferable that the contact layer 50c consists of a plurality of elements selected from Cr, Ti, Ni, and Mo.

Incidentally, when the contact layer 50c, the diffusion prevention layer 50b, and the mounting layer 50a consist of one or a plurality of specified elements, a case where an element other than the specified elements is inevitably or intentionally contained in these layers is not excluded. In that case, the content ratio of the other element is, for example, less than 10 at %, preferably less than 3 at %, and further preferably less than 1 at %.

As illustrated in FIG. 3, the diffusion prevention layer 50b is disposed between the contact layer 50c and the mounting layer 50a in the electrode portion 5, and is sandwiched between the mounting layer 50a and the contact layer 50c in an up-down direction. The diffusion prevention layer 50b prevents the elements contained in the film and layer such as the strain-resistance film 32 or the contact layer 50c disposed below the diffusion prevention layer 50b from diffusing into the mounting layer 50a disposed on the diffusion prevention layer 50b, and prevents the elements from being deposited on the upper surface of the mounting layer 50a. Incidentally, it is preferable that the diffusion prevention layer 50b is disposed directly below the mounting layer 50a even when the strain-resistance film 32 or the electrode portion 5 has a multilayer structure of four or more layers.

The diffusion prevention layer 50b can be formed by a vapor deposition method, sputtering, or the like. The thickness of the diffusion prevention layer 50b is not particularly limited and is, for example, 1 to 500 nm, preferably 5 to 50 nm. When the thickness of the diffusion prevention layer 50b is too thin, a continuous film becomes difficult to form, and the diffusion prevention function may be weakened, and when the thickness is too thick, a problem such as film peeling may occur or a problem such as a decrease in productivity (throughput) due to an increase in film formation time may occur.

It is preferable that the diffusion prevention layer 50b contains a transition element belonging to a fifth or sixth period, from the viewpoint of preventing the elements contained in the strain-resistance film 32, the contact layer 50c, or the like from diffusing into the upper layer. Specifically, it is preferable that the diffusion prevention layer 50b contains one or a plurality of elements selected from Y, Zr, Nb, Mo, Tc, Ru, Rh, Pd, Ag, La, Ce, Pr, Nd, Pm, Sm, Eu, Gd, Tb, Dy, Ho, Er, Tm, Yb, Lu, Hf, Ta, W, Re, Os, Ir, Pt, and Au.

In addition, it is further preferable that the diffusion prevention layer 50b contains a platinum group element. Specifically, it is preferable that the diffusion prevention layer 50b contains one or a plurality of elements selected from Ru, Rh, Pd, Os, Ir, and Pt. Since the platinum group elements have low reactivity and are chemically stable, the diffusion prevention layer 50b containing a platinum group element exhibits a particularly suitable diffusion prevention effect even in a high temperature environment. Incidentally, among the platinum group elements, particularly, Pt has a track record of being used in other electrode fields, and has greater technological accumulation than other platinum group elements.

It is also preferable that the diffusion prevention layer 50b consists of a transition element belonging to the fifth or sixth period. In addition, it is also preferable that the diffusion prevention layer 50b consists of a platinum group element.

As illustrated in FIG. 3, the mounting layer 50a located at an uppermost layer of the electrode portion 5 is exposed on the upper surface of the strain-resistance film 32 with an electrode. An external wiring (not illustrated) composed of a fine wire made of Au, Al, or the like is joined to the mounting layer 50a in the pad portion 55 illustrated in FIG. 1 by wire bonding or the like. Incidentally, the pressure sensor 1 using the external wiring (not illustrated) composed of a fine wire made of Au or Al can be used even in a high temperature environment where the temperature is equal to or higher than the melting point of solder, and has good heat resistance. In addition, the pressure sensor 1 using an intermediate wiring 72 composed of a fine wire made of Au can be further improved in heat resistance than a pressure sensor using an external wiring composed of a fine wire made of Al.

The mounting layer 50a can be formed by a vapor deposition method, sputtering, or the like. The thickness of the mounting layer 50a is not particularly limited and is, for example, 10 to 400 nm, preferably 100 to 300 nm. When the thickness of the mounting layer 50a is too thin, a continuous film becomes difficult to form, and adhesiveness to the external wiring deteriorates, which is a risk. When the thickness of the mounting layer 50a is too thick, a problem such as film peeling may occur, or a problem such as a decrease in productivity (throughput) due to an increase in film formation time may occur.

It is preferable that the mounting layer 50a contains at least one of Au, Al, and Ni from the viewpoint of heat resistance and joinability with the external wiring. In addition, from the viewpoint of further enhancing compatibility with a high temperature environment by enhancing heat resistance, it is further preferable that the mounting layer 50a contains Au having low resistance and a high melting point even in a high temperature environment. In addition, in the case of using a fine wire made of Au as the material of the external wiring, since the mounting layer 50a contains Au, the materials of both the intermediate wiring 72 and the mounting layer 50a are Au. Accordingly, the adhesiveness of a joint portion between the external wiring and the mounting layer 50a is improved.

In addition, it is preferable that the mounting layer 50a consists of at least one of Au, Al, and Ni, and is also particularly preferable that the mounting layer 50a consists of Au.

As illustrated in FIG. 2, in the present embodiment, the sensor member 2 is configured such that the electrode portion 5 covers at least a part of the protective film 4. An end of the protective film stacked on the strain-resistance film is more likely to peel off than other portions; however, since the electrode is formed on the protective film 4 by implementing such a configuration, a peeling defect such as peeling off from an end of the protective film 4 (for example, the opening peripheral edge 43 or the like) or damage due to impact can be prevented.

In addition, as illustrated in FIG. 3, the electrode portion 5 may include the mounting layer 50a containing gold. Since the mounting layer 50a contains gold, the adhesiveness of the mounting layer 50a to the Au wiring with good heat resistance is particularly good. Therefore, the electrode portion 5 including the mounting layer 50a is improved in high-temperature resistance, and exhibits good adhesion to the wiring.

In addition, the electrode portion 5 may include the diffusion prevention layer 50b consisting of a platinum group element. Since the diffusion prevention layer 50b contains a platinum group element that is chemically stable, interdiffusion between the membrane 3 and the electrode portion 5 can be effectively prevented.

In addition, the electrode portion 5 may include the contact layer 50c contacting to the membrane 3. The electrode portion 5 including the contact layer 50c can effectively prevent interdiffusion between the membrane 3 and the electrode portion 5. In addition, the electrode portion 5 including the contact layer 50c prevents a change in the property of the membrane 3 under a high temperature environment, is improved in high-temperature resistance, and exhibits very good adhesion to the wiring even after being exposed to the high temperature environment.

Examples of the element contained in the contact layer 50c are Cr, Ti, Ni, Mo, and the like. Since such elements easily form alloys with other metal elements, such elements are effective in preventing a peeling defect of the films by ensuring contacting strength between the films and between the layers.

The protective film 4 may consist of an oxynitride. Since the protective film 4 has high strength, the structural strength particularly at an end portion can be improved, and the reliability of the sensor member 2 can be improved.

In addition, as illustrated in FIG. 1, in the present embodiment, the strain-resistance film 32 includes the resistance portions R1 to R4 that detect a pressure. The sensor member 2 is suitably used for the pressure sensor 1.

As illustrated in FIG. 2, in the present embodiment, the membrane 3 includes the metal base member 30; the insulating film 31 placed on the metal base member 30; and the strain-resistance film 32 placed on the insulating film 31. The membrane 3 is suitable for use in the pressure sensor in a high temperature environment. In addition, since metal is used as a base material, the pressure sensor with high mechanical strength and high reliability can be realized.

In addition, the electrode portion 5 is disposed as an upper layer of the strain-resistance film 32 and inside the strain-resistance film 32. Since the electrode portion 5 is disposed in such a manner, a reduction in the size of the sensor member 2 can be realized.

Second Embodiment

Figure 7:
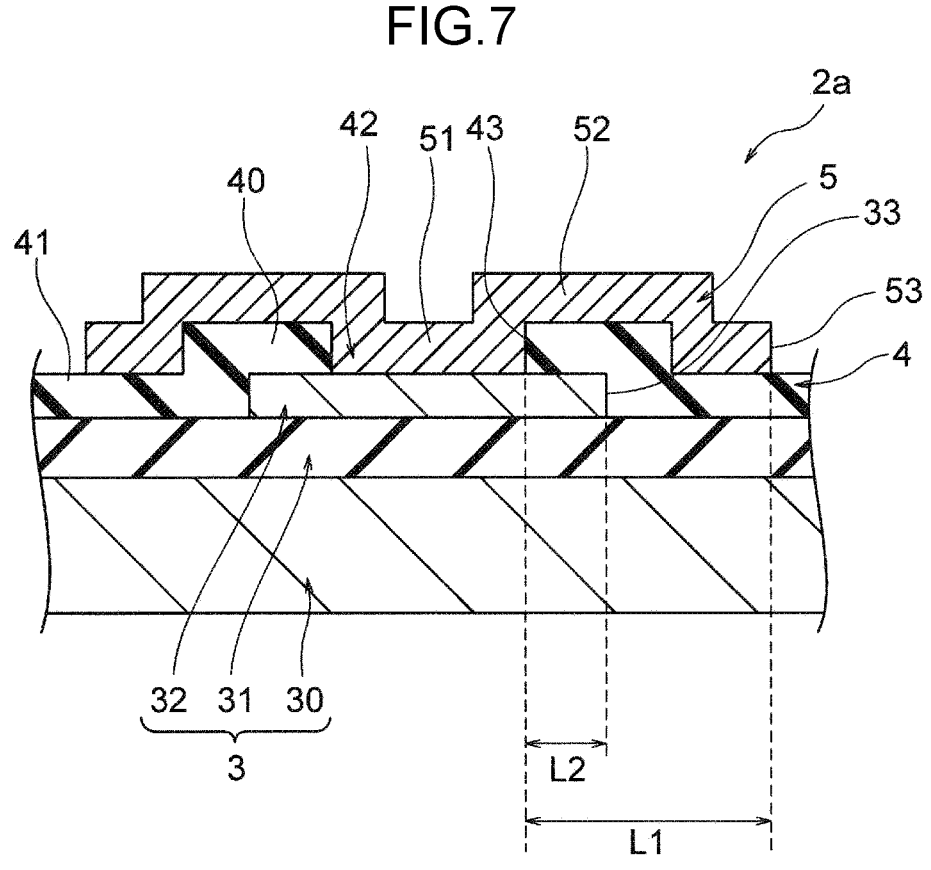
FIG. 7 is a cross-sectional view of a sensor member according to another embodiment.

A sensor member 2a according to the present embodiment illustrated in FIG. 7 differs from that of the first embodiment only in the electrode portion 5. The description of common portions will be omitted, and hereinafter, different portions will be mainly described in detail. Portions not described below are same as described in the first embodiment.

As illustrated in FIG. 7, the skirt portion 52 is disposed on the protective film 4. The end edge 53 of the skirt portion 52 is disposed above the outer edge portion 41. The end edge 53 of the skirt portion 52 is disposed outside the end edge 33 of the strain-resistance film 32.

As illustrated in FIG. 7, the skirt portion 52 covers the protective portion 40 and covers at least a part of the outer edge portion 41. The length L1 of the skirt portion 52 from the inner side connected to the energized portion 51 to the end edge 53 is longer than the length L2 of a protected portion of the strain-resistance film 32, the protected portion being covered with the protective portion 40.

The electrode portion 5 is disposed as an upper layer of the strain-resistance film 32 to spread outward from the strain-resistance film 32. Since such disposition is implemented, the contacting area between the electrode portion 5 and the protective film 4 can be increased and the strain-resistance film 32 can be effectively protected from an external environment.

Incidentally, the above-described embodiments include, within the technical scope, various modes in which the design is changed or the configuration of each embodiment is replaced without departing from the concept of the claims.

For example, the metal base member 30 may be formed in a hollow cylindrical shape having a space below. The metal base member 30 may be formed such that the insulating film 31 and the strain-resistance film 32 are formed on an end wall disposed at one end of the hollow cylinder. A pressure of a fluid flowing through the hollow space of the metal base member 30 can be measured by using such a sensor member.

Incidentally, the sensor member may be used for a sensor other than the pressure sensor, and examples of the sensor using the sensor member 2 include physical quantity sensors such as an acceleration sensor, a torque sensor, and an inclination sensor.

EXPLANATIONS OF LETTERS OR NUMERALS

1 PRESSURE SENSOR
2, 2a SENSOR MEMBER
3 MEMBRANE
30 METAL BASE MEMBER
31 INSULATING FILM
32 STRAIN-RESISTANCE FILM
33 END EDGE
34 DETECTION PORTION
R1 FIRST RESISTANCE PORTION
R2 SECOND RESISTANCE PORTION
R3 THIRD RESISTANCE PORTION
R4 FOURTH RESISTANCE PORTION
35 RESISTANCE WIRING PORTION
35a CENTRAL PORTION
35b SIDE PORTION
36 PAD CONNECTION PORTION
4 PROTECTIVE FILM
40 PROTECTIVE PORTION
41 OUTER EDGE PORTION
42 OPENING
43 OPENING PERIPHERAL EDGE
5 ELECTRODE PORTION
50a MOUNTING LAYER
50b DIFFUSION PREVENTION LAYER
50c CONTACT LAYER
51 ENERGIZED PORTION
52 SKIRT PORTION
53 END EDGE
54 WIRING PORTION
55 PAD PORTION

What is claimed is:

1. A sensor member comprising:
a membrane;
a protective film covering a part of the membrane; and
an electrode portion connected to the membrane,
wherein the membrane comprises a strain-resistance film,
wherein the protective film has insulating properties, and covers a part of the strain-resistance film, and
wherein the electrode portion covers at least a part of the protective film, and is in contact with the strain-resistance film at a portion where the strain-resistance film is not covered with the protective film.

2. The sensor member according to claim 1,
wherein the electrode portion includes a mounting layer containing gold.

3. The sensor member according to claim 1,
wherein the electrode portion includes a diffusion prevention layer consisting of a platinum group element.

4. The sensor member according to claim 1,
wherein the electrode portion includes ana contact layer
   contacting with the membrane.

5. The sensor member according to claim 1,
wherein the protective film consists of an oxynitride.

6. The sensor member according to claim 1,
wherein the membrane comprises a metal base member
   and an insulating film placed on the metal base mem-
   ber, and the strain-resistance film is placed on the
   insulating film.

7. The sensor member according to claim 6,
wherein the electrode portion is disposed as an upper
   layer of the strain-resistance film to spread outward
   from the strain-resistance film.

8. The sensor member according to claim 6,
wherein the electrode portion is disposed as an upper
   layer of the strain-resistance film and inside the strain-
   resistance film.

9. The sensor member according to claim 1,
wherein the strain-resistance film includes a resistance
   portion that detects a pressure.

10. The sensor member according to claim 1,
wherein the protective film and the electrode portion are
   in contact with one surface of the strain-resistance film.

11. The sensor member according to a claim 1,
wherein a part of the protective film is disposed between
   a part of the strain-resistance film and a part of the
   electrode portion along a thickness direction of the
   protective film.

* * * * *